Dec. 12, 1967 W. J. LOSMAN ET AL 3,357,654
COMBINATION REEL AND HOLDER THEREFOR
Filed June 1, 1966 2 Sheets-Sheet 1

INVENTORS
WILLIAM J. LOSMAN
KRISTINA I. ELLIOTT
BY
Gerald H. Peterson
-ATTORNEY-

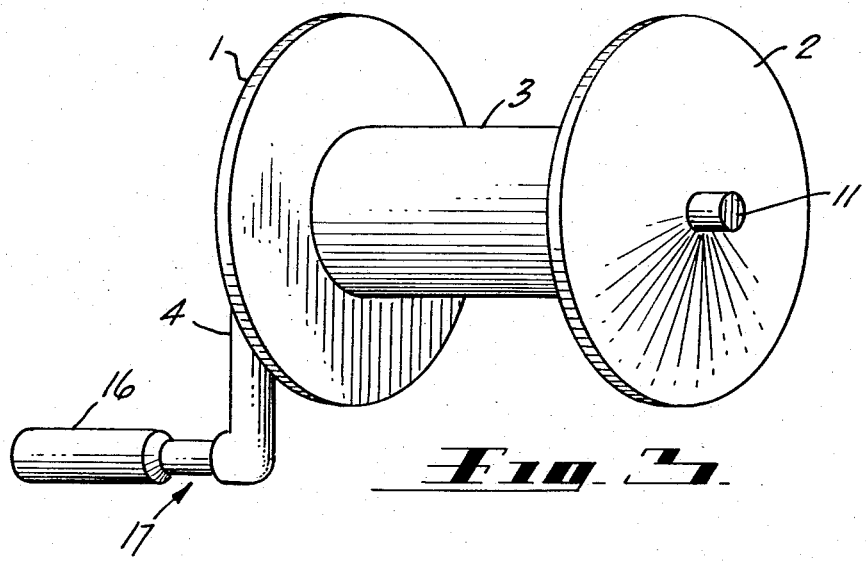
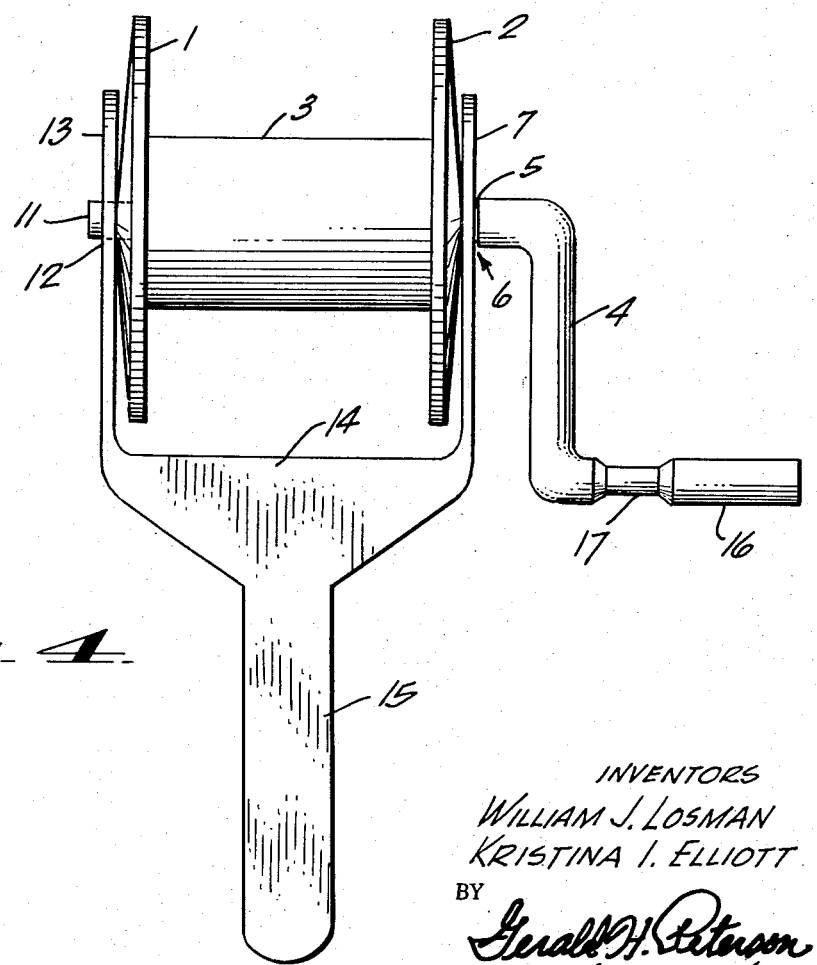

United States Patent Office 3,357,654
Patented Dec. 12, 1967

3,357,654
COMBINATION REEL AND HOLDER THEREFOR
William J. Losman, 13441 Erwin St., Van Nuys, Calif. 91401, and Kristina I. Elliott, 1527 Yale St., #1, Santa Monica, Calif. 90404
Filed June 1, 1966, Ser. No. 554,479
2 Claims. (Cl. 242—96)

ABSTRACT OF THE DISCLOSURE

The invention relates to a reel particularly useful as a kite string reel consisting of a holder unitarily molded of plastic material and a reel unitarily molded of plastic material adapted to be readily assembled as a reel with holder therefor and readily disassembled. For this purpose the reel has a drum and two flanges, one at each end of the drum, with one of the flanges having an axle protruding therefrom and with the other axle having, protruding from the other drum, a structurally unitary turning handle extending outwardly from this other axle, and the holder for the reel having two holder arms, one with a circular bearing hole for the first axle for receiving the first axle and the other axle having a peripheral indentation between the outer face of said drum flange and the end of the turning handle facing this flange. The second axle is adapted to be snapped into position into the second holder arm into the bearing having a slot slightly narrower than said axle.

---

Our invention relates to a combination of reel and handle or holder therefor, particularly useful for unwinding and winding the string in flying a kite and also useful for some fishing.

Many forms of reels with handles or holders are available, but, so far as is known, none are as simple and inexpensive as one made in accordance with our invention, which also is so designed that both the reel and handle can be separately molded of plastic material and then easily and quickly assembled for use.

It is accordingly an object of our invention to provide a reel and handle therefor which is simple and inexpensive, especially when the reel and handle are each molded from plastic material.

It is a further object of our invention to design a reel and handle which can be readily molded from plastic material and which when the reel and handle are assembled provides a strong, durable, and simple and easily operable device.

The above and further objects and advantages of our invention will become readily apparent to those skilled in the art in connection with the following description of a preferred embodiment of the invention taken together with the accompanying drawings, wherein:

FIGURE 3 is another perspective view of the reel in accordance with my invention; and FIGURE 4 is a front view of the reel and handle or holder therefor shown assembled for use.

Figure 1:
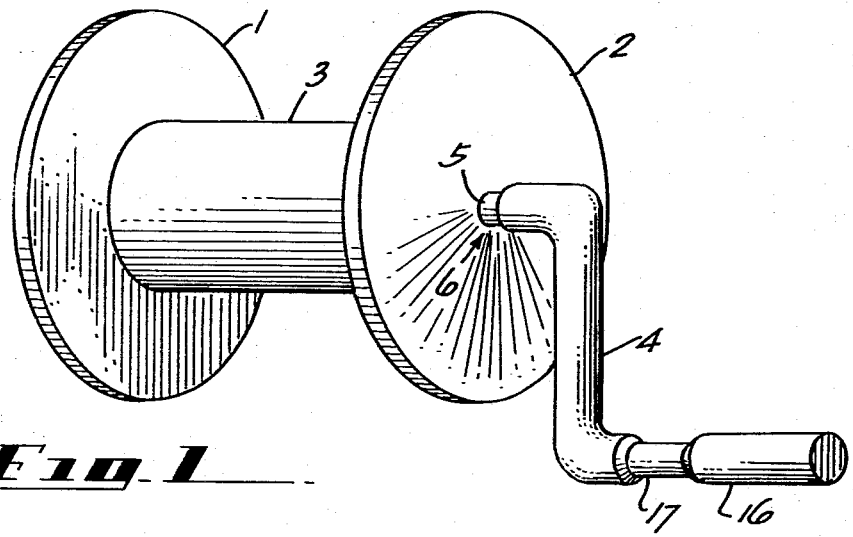
FIGURE 1 is a perspective view of the reel adapted to be assembled with the handle or holder shown in FIGURE 2.

FIGURE 1 shows the reel in accordance with this embodiment of my invention having flanges 1 and 2 and drums 3. This reel also has turning crank 4 with an axle portion 5 rigidly molded as a part of flange 2 and turning crank 4.

Extending somewhat from flange 2 is an indentation 6 around the periphery of axle 5. This indentation is adapted to receive holder arm 7 of the handle shown in FIGURE 2 by, at such indenation, forcing or snapping axle 5 into bearing hole 8 at the upper end of arm 7 past projections 9 and 10 spaced in opposition from one another a distance slightly less than the diameter of axle 5 in the indentation 6 so that axle 5 can be snapped into position in bearing hole 8, where it is held in position by projections 9 and 10, unless deliberately forced outward therebetween.

The reel is assembled with the handle or holder by first inserting axle 11 (shown in FIGURE 3) into bearing hole 12 of holder arm 13 (shown in FIGURE 2), and then axle 5 is snapped into position in bearing hole 8 as described above.

Axle 11 has an outside diameter substantially equal to the inside diameter of bearing hole 12 so that axle 11 will readily turn therein. The outside diameter of axle 5 is likewise substantially equal to the inside diameter of bearing hole 8 so that axle 5 will readily rotate therein. The width of indentation 6 is substantially equal to the thickness of holding arm 7 in the vicinity of bearing hole 8 so that this portion of holding arm 7 will hold the reel in position between the flange 2 adjacent axle 5 and the inside of indentation 6 adjacent turning crank 4.

The handle has cross member 14, holding arms 7 and 13 and hand-holding portion 15 adapted to be readily held in the hand.

As shown particularly in FIGURE 4 the flanges 1 and 2 on the outside of each are made thicker near the axle 11 of flange 1 and axle 5 of flange 2 to improve the strength of the flanges of the reel and to act as rotation guides against the inner sides of holding arms 13 and 7 without the undue friction of the flanges against the inside of arms 7 and 13 which would occur if the outside of these flanges were flat. This form of the flanges also makes it possible to more readily mold them from plastic material as a part of the unitary structure. In addition this form makes it easier to fit the holder arms into position. The flanges just fit within the arms, or the arms may be at such a distance that when the reel is in position they press slightly against the flanges.

On the hand grasping portion 16 of turning crank 4 is a peripheral notch 17 for readily making a turn or few turns of a kite string or a fishing line, for example, to hold the reel from turning with the string or line pulling taut against turning crank 4, with it in the upper position (not shown on the drawing).

Figure 2:
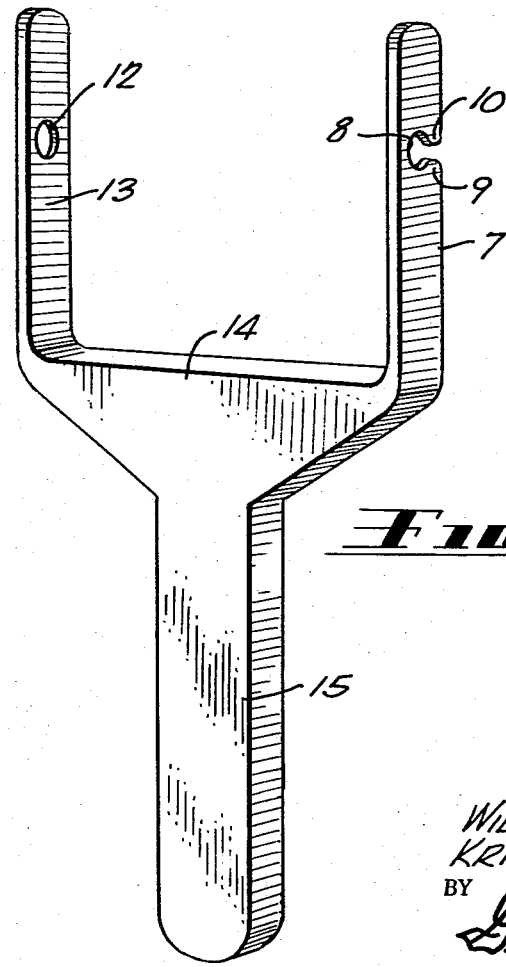
FIGURE 2 is a perspective view of the handle or holder adapted to be assembled with the reel shown in FIGURE 1.

The reel shown particularly in FIGURES 1, 3, and 4 is preferably molded from plastic material as a unitary structure and the same is true for the handle or holder shown in FIGURES 2 and 4.

Obvious structural and component modifications of the invention as described and illustrated herein are deemed to be within the spirit and scope of the appended claims.

We claim:
1. The combination of a reel and a holder therefor, both composed of a plastic material, comprising: a reel of unitary structure having a drum and two flanges, one at each end of and concentric of said drum, the outer face of each of said flanges gradually tapering inwardly of said reel from the axis of said drum, the first of said flanges having a first axle member protruding therefrom and the second of said flanges having a second axle member protruding therefrom with a turning crank outboard of said second axle member, said crank having outward thereof and normal thereto a turning handle, all of the latter being structurally unitary with said second flange;

and a holder for said reel having a cross member and normal thereto, extending therefrom, and secured thereto two parallel arms spaced apart the distance between the outsides of said flanges adjacent said axle members, the first of said arms having a completely circular bearing hole therethrough adapted to receive said first axle member for retention therewithin, the second of said holder arms having a circular bearing hole and a slot therethrough connecting said hole with an edge of its arm, said slot being slightly narrower, restricted, than the diameter of said second axle member adjacent said second flange so that said second axle member must be forced through said slot in order to be received in said connecting hole; whereby said reel is assembled with said holder by first inserting said first axle member in said completely circular hole by axial movement of said reel and then by forcing said second axle member through said slot into its connecting hole by radial movement of said feel; the fits of said axles in said holes and said flanges between said arms being close but free for rotation.

2. The combination reel and holder therefor as defined in claim 1 in which the outer portions of said flanges are thicker in the central portions thereof in the vicinity of said axle members.

References Cited

UNITED STATES PATENTS

| | | | |
|---|---|---|---|
| 1,049,021 | 12/1912 | Williams | 242—129.62 |
| 1,296,268 | 3/1919 | Craig | 242—96 |
| 1,405,554 | 2/1922 | Northcraft | 242—129.6 |
| 2,244,804 | 6/1941 | Robinson | 242—55.2 |
| 2,626,763 | 1/1953 | Dunnock | 242—99 X |
| 2,772,505 | 12/1956 | Kaiser | 242—96 |
| 3,090,577 | 5/1963 | Lewandowski | 242—96 |

FRANK J. COHEN, *Primary Examiner.*

N. L. MINTZ, *Assistant Examiner.*